Figure 1:
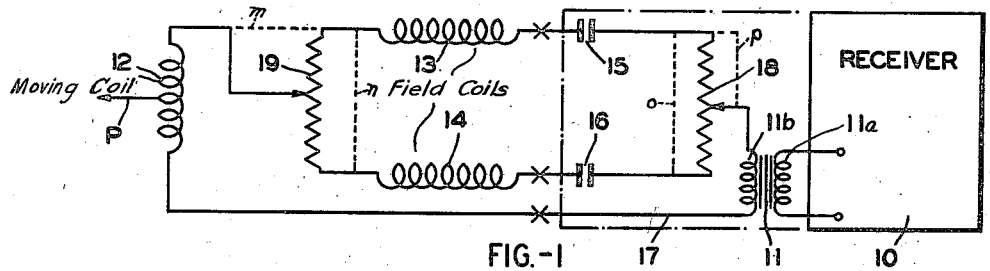

Dec. 9, 1941.　　　　K. J. KNUDSEN　　　　2,265,910

DIFFERENTIAL ELECTRODYNAMOMETER

Filed June 21, 1939

INVENTOR
KNUD J. KNUDSEN
BY
Hyde, Higley & Mayer
ATTORNEYS

Patented Dec. 9, 1941

2,265,910

UNITED STATES PATENT OFFICE 2,265,910

DIFFERENTIAL ELECTRODYNAMOMETER

Knud J. Knudsen, Cleveland, Ohio, assignor to Cleveland Patents, Incorporated, Cleveland, Ohio, a corporation of Ohio Application June 21, 1939, Serial No. 280,311

2 Claims. (Cl. 250—11)

This invention relates to improvements in a differential double tuned circuit electro-dynamometer. The device provides an indicator for unbalanced voltages of different predetermined frequencies.

One use of my improved instrument is in blind landing indicators or that type of radio controlled aviation instrument which is utilized in following the overlapping bands of two waves of different frequencies transmitted from a known point into different quadrants. This type of instrument is used to control horizontal deviation.

Devices now commonly used for the above mentioned purpose receive and rectify each frequency and then apply these frequencies to an indicator, such for instance as the vibrating reed type commonly used, or a left-right needle where each rectified frequency produces its individual effect upon the indicator and upon a balancing of the two effects the aviator knows that he is following the beam or overlapping bands of frequencies. A serious fault with this type of instrument is that it relies upon a balancing of rectified currents and therefore each of the balancing currents is individually dependent upon its rectifying means, such as a vacuum tube, a copper oxide rectifier or the like. It is obvious that if the rectifier for one of these currents weakens or fails because of aging of the rectifier or because of shorting due to an overload, then the indicator will be falsely thrown out of balance giving a wrong indication which may result in a false landing with attendant damage and possible loss of life.

One object of the present invention is to provide a landing indicator which avoids all of the objections to indicators using vacuum tube or other rectifiers by the employment of tuned circuits, wherein the two frequencies pass through and are amplified in a receiver and on the output side thereof are passed through two tuned circuits, each tuned to one of the frequencies, and the currents of the tuned circuits are applied in an opposing manner to the indicator, so that, depending upon whether the two effects are balanced, or one preponderates over the other, the aviator is advised as to whether he is following exactly the center line of the overlapping bands of the two frequencies or is at one side or the other side of that line. In this improved type of instrument there is no possibility of a loss of rectification on one side of the instrument giving a false indication.

Another object of the present invention is to provide a separable amplifier and instrument for utilizing two different frequencies, with means for tuning every instrument to a standard amplifier or, conversely, every amplifier to a standard instrument so that upon failure of either of these units a new one may be substituted for either one very quickly and with accurate results following immediately.

Other purposes and advantages of the present invention will appear from the accompanying drawing and description and the essential features will be set forth in the claims.

Figure 2:
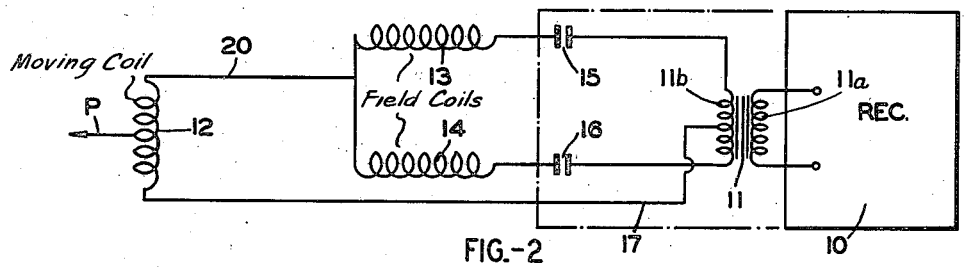
Figure 3:
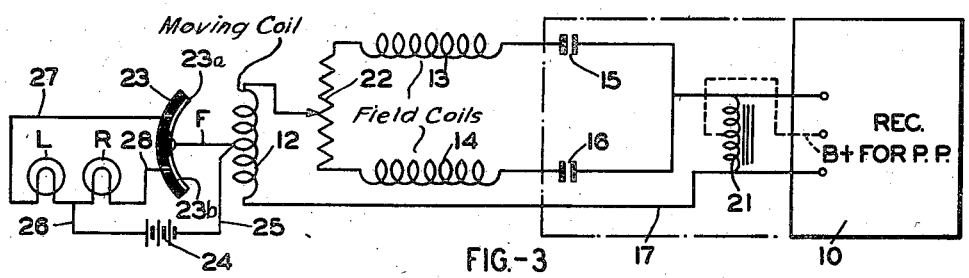
Figure 4:
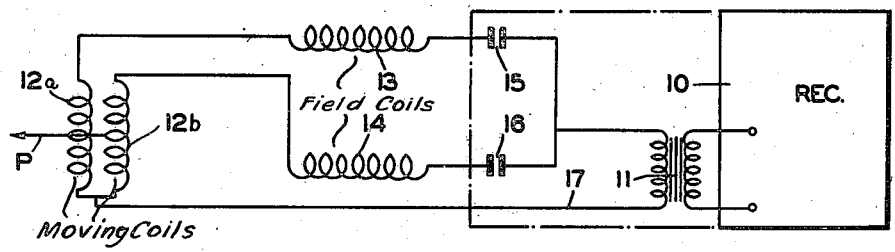

In the drawing, Fig. 1 is a diagrammatic view illustrating one modification of my improved indicator and its control circuits; Fig. 2 is a similar view of a second modification; Fig. 3 is a similar view of a third modification; Fig. 4 is a similar view of still another modification; and Fig. 5 is a diagram, illustrating radio beam transmission.

In Fig. 1 I have illustrated at 10 a receiver such as is in common use on airplanes. The details of this receiver are immaterial as different types are commonly used and all of them will give satisfactory results when combined with my improved indicator. I have made the assumption that the receiver here shown is of a very common type having an output transformer 11 having a primary 11a and a secondary 11b. The current from the secondary of this transformer is utilized to control the pointer P of a moving coil dynamometer of which the moving coil is indicated at 12 and the field coils are indicated at 13 and 14. This dynamometer may have either an air core or an iron core. It will be understood that the coils 13 and 14 are wound on the dynamometer core either separately or one over the other, or in sections, but in any case so that the coil 13 tends to move the pointer P in one direction while the coil 14 tends to move the pointer P in the opposite direction. It will be noted that there are two circuit portions connected in parallel between one end of the transformer secondary 11b and one end of the moving coil 12. One circuit portion includes the coil or impedance 13 and a condenser or capacitor 15. The other circuit portion includes the coil or impedance 14 and the condenser or capacitor 16. The opposite ends of the coil 12 and secondary 11b are electrically connected by the line 17. Preferably but not necessarily two potentiometers are supplied, one at 18 and the other at 19. The potentiometer 18 is used to compensate for deviation from exact values in commercial condensers 15 and 16. The potentiometer 19 is used for matching the impedances of the two parallel circuit portions to eliminate faulty deflection caused by variation in turns of field coils 13 and 14 when commercially produced. If sufficient exactness is obtained in coils 13 and 14 and in the condensers 15 and 16, both potentiometers might be omitted, in which case the connections indicated by broken lines at m, n, o, p, in Fig. 1 may be used.

Figure 5:
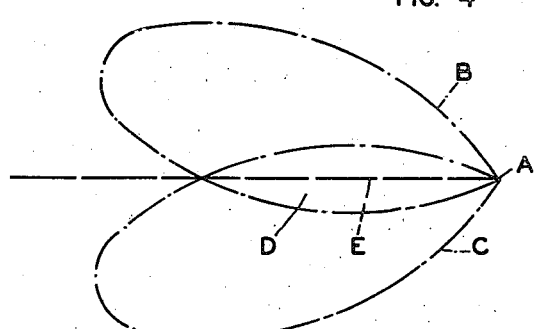

Assuming that the plane receiving set 10 is receiving the modulation frequency combination of 75 and 100 cycles, then the action of the device of Fig. 1 is as follows:

Let us assume that at the landing station, indicated at A, Fig. 5, the transmitter sends out the two frequencies in such manner that the frequency 75 produces a band conventionally indicated at B, and the frequency 100 a band conventionally illustrated at C, D indicating the overlapping portions of the two bands and the dotted line E the center line of the overlapping portion, which line the aviator should follow as nearly exactly as possible in order to make a safe landing.

The combined frequencies are fed through the receiver 10, and are amplified to produce a combined effect at the output transformer 11. One frequency passes through a path including potentiometer 18, condenser 15, coil 13, potentiometer 19, moving coil 12 and line 17 back to the transformer secondary. The other frequency follows a path including potentiometer 18, condenser 16, coil 14, potentiometer 19, moving coil 12 and line 17 back to the secondary of the transformer. The circuit including coil 13 and condenser 15 is series tuned to and is therefore responsive to but one of said frequencies, say 75 cycles, while the circuit portion including coil 14 and condenser 16 is series tuned to and is responsive only to the other of said frequencies, namely, 100 cycles. When the effects of the two frequencies upon the two coils 13, 14, as those effects are transmitted by said coils in opposed relation to the moving coil 12, are equal or bear a certain predetermined relation to each other, the indicator or pointer P will show zero deflection, and the aviator is thereby advised that he is following exactly the center line E in the overlapping portions of the frequency bands, but if the pointer P is deflected to one side or the other, as the result of preponderance of the voltage of one of coils 13, 14 over the other, he knows that he is to one side or the other side of the center line E, and modifies his course accordingly, with the result that he is able, by observation of the pointer to effect his landing with the plane approaching the landing field from the proper direction. When used for blind landing indication, the voltage in one of the above mentioned parallel circuit portions will decrease at approximately the same rate as the other increases and as the current through the meter is some value above zero at all times while the instrument is being used, the deflection of the pointer P will be approximately linear and proportional to deviation so that the instrument may be accurately calibrated.

The instrument here described is of extremely sturdy construction and will readily withstand overloads such as a momentary wattage input in excess of one hundred times normal wattage, which might occur if the automatic volume control circuit should fail. It is not dependent upon either vacuum tubes or any type of rectifier and therefore not subject to variation on account of age or for other reasons but is reliable and dependable under all conditions, as before stated.

The feature of interchangeability of indicator instruments and amplifiers previously referred to is taken care of in the following manner. The parts are separated at the points indicated by X in Fig. 1 so that the indicator instrument case contains the dynamometer with its field coils 13 and 14, its moving coil 12 and the potentiometer 19, and a portion of the line 17. The dot-dash lines connected with the receiver 10 indicate that one casing houses the receiver including its output transformer 11, the potentiometer 18 and the condensers 15 and 16, together with a portion of the line 17. It will be readily understood without out illustration that the two units may be separably connected at the points X by interfitting prongs in the usual manner. It results from this arrangement of the parts that the amplifier unit may be adjusted by means of the potentiometer 18 to adjust the amplifier to a standard indicator instrument having predetermined impedances 13 and 14. In a similar manner the instrument unit may be adjusted by the potentiometer 19 so as to coact with a standard amplifier. Then upon failure of either of the units a spare unit such as is carried by all large transport planes may be used to replace a unit which has failed with the certainty that the new unit, either amplifier or instrument, is adjusted to coact perfectly with the associated unit.

The modification of Fig. 2 is similar to that of Fig. 1 except that no potentiometers have been indicated and the line 17 has a center tap on the transformer secondary 11b. All parts similar to that of Fig. 1 bear similar reference characters. It will be noted that only the differential current from the two circuit portions 13—15 and 14—16 is fed to the moving coil 12 through line 20.

The circuit of Fig. 3 is similar to that of Figs. 1 and 2 but instead of a double winding transformer an autotransformer 21 has been used. This circuit can be used whether single or push-pull tube output is used because the condensers 15 and 16 block any D. C. current from flowing through the instrument. This diagram also illustrates how the condensers 15, 16 may be outside the amplifier or receiver casing and may be a part of the instrument itself. In this case only one potentiometer 22 is used and it is adjusted to tune the two different circuits to the desired frequencies to take care of variations in both the impedances and the condensers. The broken line indicates a B+ connection from a center tap on the autotransformer for use with push-pull tube output.

The circuit of Fig. 4 represents the two parallel circuit portions as having windings on the same moving coil, these moving coil windings being here indicated as 12a and 12b. It is not as efficient as the previously described circuit because the wire size on the moving coil must be decreased to half of that shown in the previous modifications with a corresponding increase of resistance. It also requires the use of three connecting links from the moving coil and eliminates the possibility of using the potentiometer 19 if such should be desirable.

While I have illustrated a moving coil and a pointer to give a visual indication, it will be obvious that the principle here disclosed may be used for any other satisfactory type of indication. For instance, two red lights might be located respectively on the left and right hand sides of the instrument with the circuit tuned to 75 cycles lighting one of the lamps and with the circuit tuned to 100 cycles lighting the other of the lamps. It is obvious that the principle here disclosed may be used to produce any desired kind of signal.

Obviously the preponderating effect of one of the tuned circuits over the other may be used to give one of the above-mentioned indications, or the differential current, the resultant of the two tuned circuits, may be fed to any suitable device. For instance, in Fig. 3 I have indicated an oscillating contact member F replacing the pointer P of the other figures. A block of insulating material is shown at 23 carrying the contact portions 23a and 23b. A battery at 24 is connected by line 25 to the contact member F and by line 26 with the lamps L and R which are connected by lines 27 and 28 respectively with the contact portions 23a and 23b. Variation to one side or the other of the true course will cause one or the other of the lamps to light. The same principle applies if different audible signal producers are substituted for the lamps L and R.

The portion of Fig. 3 just described is understood to be diagrammatic and illustrative only.

What I claim is:

1. In combination with a receiver adapted to receive waves of two different modulated frequencies and having an output circuit, a dynamometer having a single moving coil and two field coils, said field coils being arranged respectively to cause movement of said moving coil in opposite directions, said field coils being connected in parallel circuit portions in said output circuit, said parallel circuit portions being connected together in series with said moving coil, a capacitance in each of said parallel circuit portions for tuning one of said circuit portions to one of said frequencies and for tuning the other of said circuit portions to the other of said frequencies, a potentiometer connecting said capacitances in parallel and providing a balancing control for said capacitances, and a potentiometer connecting said field coils in parallel and providing a balancing control for said field coils, whereby the electro-magnetic effects of said field coils are balanced against each other and their net effect is indicated by said moving coil.

2. In combination with a receiver adapted to receive waves of two different modulated frequencies and having an output circuit, a dynamometer having a single moving coil and two field coils, said field coils being arranged respectively to cause movement of said moving coil in opposite directions, said field coils being connected in parallel circuit portions in said output circuit, said parallel circuit portions being connected together in series with said moving coil, a capacitance in each of said parallel circuit portions for tuning one of said circuit portions to one of said frequencies and for tuning the other of said circuit portions to the other of said frequencies, whereby the electro-magnetic effects of said field coils are balanced against each other and their net effect is indicated by said moving coil, said capacitances being permanently connected in said receiver output circuit by adjustable means connecting said capacitances in parallel, whereby said adjustable means may be set to balance said capacitances against standard field coils, said field coils being permanently assembled in an instrument by adjustable means connecting said field coils in parallel, whereby said last named means may be set to balance said field coils against a standard receiver and its capacitances, and separable connections between the capacitance and the field coil in each of said parallel circuit portions, so that in use, upon failure of either said instrument or of said receiver, said separable connections may be broken and an instrument or receiver substituted for the failing apparatus with assurance that the parallel circuit portions will function as before the substitution without any adjustments.

KNUD J. KNUDSEN.